Sept. 30, 1969    W. F. MEYERS ET AL    3,470,029
AMMONIA BATTERY SYSTEM
Original Filed Sept. 8, 1964
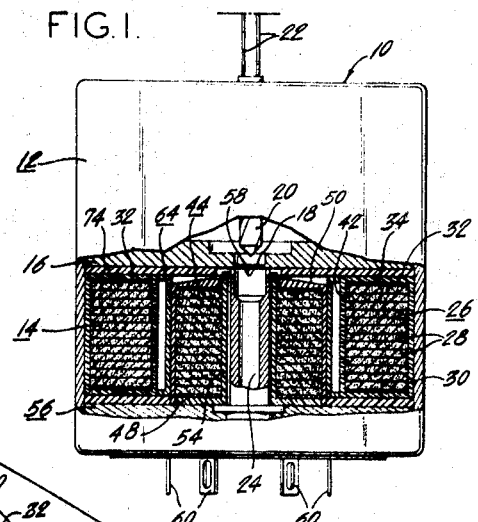
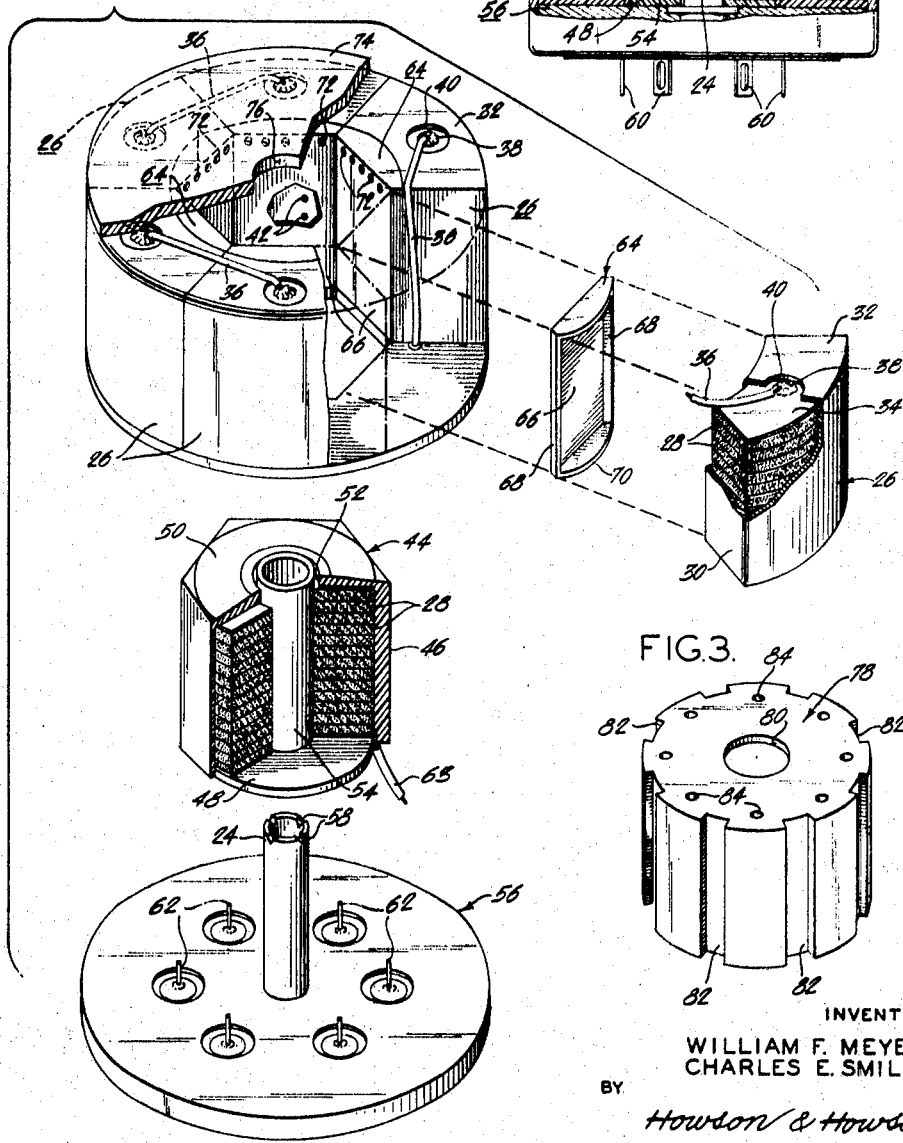
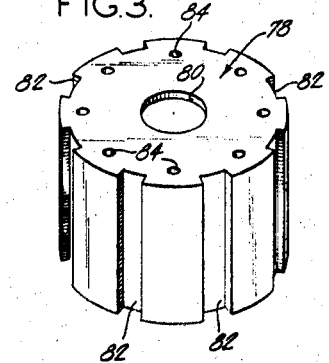
INVENTORS:
WILLIAM F. MEYERS
CHARLES E. SMILEY
BY
Howson & Howson
ATTYS.

United States Patent Office 3,470,029
Patented Sept. 30, 1969

3,470,029
AMMONIA BATTERY SYSTEM
William F. Meyers, Blue Bell, and Charles E. Smiley, Ambler, Pa., assignors to Honeywell Inc., Minneapolis, Minn., a corporation of Delaware
Continuation of application Ser. No. 394,677, Sept. 8, 1964. This application Apr. 9, 1968, Ser. No. 730,668
Int. Cl. H01m 17/06, 21/10
U.S. Cl. 136—90
17 Claims

ABSTRACT OF THE DISCLOSURE

A rapid activating liquid ammonia battery comprised of a battery section and a liquid ammonia reservoir, the battery section consisting of a central A section and a plurality of B–C sections disposed peripherally about the A section. The cells of each section are enclosed in individual plastic cups and the entire battery section is enclosed in plastic. Means are provided for transmitting the liquid ammonia to the battery section into operating contact with the cells to thereby activate the battery.

---

This is a continuation of our co-pending application Ser. No. 394,677, now abandoned, filed Sept. 8, 1964, and titled "Ammonia Battery System."

The present invention relates generally to an ammonia battery system and more specifically to a reserve liquid ammonia fuse battery.

The broad principles of operation of liquid ammonia batteries are set forth in U.S. Patent Nos. 2,992,289 and 3,083,252, among others, assigned to the assignee company of the present application and additionally described in copending application Ser. No. 281,964, now Patent No. 3,239,385, filed May 21, 1963, and the subject matters thereof are incorporated herein for broad reference purposes and reference is made thereto for an explanation of the operation of such type batteries.

Primarily the present application is directed to improvements in the construction and resulting operation of a liquid ammonia battery as compared with the construction shown for example in application Ser. No. 281,964 now Patent No. 3,239,385. It will be seen from these prior application and patents that various of the cells were circular in configuration and the present invention discloses a new type of segmented construction which provides more plane cell area and greatly increased output efficiency of the battery.

The battery of the present invention likewise discloses an improvement of construction wherein the overall unit is substantially all effective battery.

A further feature of the present invention is to provide means in such a battery construction to obtain full discharge value thereof faster than the other types of batteries and which results from modifications of the fluid distribution portions of the battery.

The present invention also teaches a unique method of construction to minimize electrical leakage.

The construction of the present battery improves the system of keeping liquid and solid contact since the various elements are maintained in alignment regardless of shaking, heating, chilling, shipping and the like and with no interference of output, known as noise.

The battery construction of the present invention additionally results in no variation of voltage output within such defined limits as required for good reliable functioning of the invention.

Additional features and advantages of the present invention will be more readily apparent from the following detailed description of embodiments thereof when taken together with the accompanying drawings in which:

FIG. 1 is an elevational view parts thereof being broken away and parts in section of an overall battery construction including the liquid ammonia reservoir, battery section and activator lance;

FIG. 2 is an exploded view, partly in section and parts being broken away for clarity of the battery section; and FIG. 3 is a perspective view of a modified center section cup.

Referring now more specifically to the drawings, the overall battery construction is indicated at 10. The battery includes a liquid ammonia or the like reservoir generally indicated at 12 and a battery section generally indicated at 14. The reservoir section is known as the activator section consisting of a cup-shaped member formed of steel having desired tensile strength and having on its top surface a centrally formed inwardly deformed portion and the open end of the cup is closed by a steel bulkhead which is braised to the cup to form a sealed container, or as more fully described and shown in said copending applications. The bulkhead 16 divides the activator section from the battery section. The center of the bulkhead 16, in the interior of the activator cup, has a thinned area 18 and this constitutes a rupturable membrane adapted to be pierced by lance 20 in a manner described in said aforesaid applications and adapted upon energization of actuating means through leads 22 to move downwardly and pierce membrane 18 while at least partially entering into guide tube 24.

The battery section 14 consists of a plurality of B–C sections 26, in the illustrated embodiment numbering 6, and appropriately wired together. Each of the B and C sections is composed of a plurality of cells 28 in stacked relationship and including anodes and cathodes in a known manner. Each of these B–C sections is enclosed in a molded polypropylene cup 30 and closed at the top by a plate 32 which is heat sealed to close the cup. A metallic plate 34 is superimposed on the uppermost one of the cells and lead 36 is soldered thereto as at 38. For purposes of securing the lead to the plate, the top 32 is provided with an opening at 40 and which is thereafter adapted to be closed and sealed. It will be noted that the B–C sections are of a segmented circular shape and when assembled as shown in the upper portion of FIG. 2 provide a large plane cell area whereby the quantity of materials used in the components is substantially increased as compared with circular cells. This permits a substantial increase in the drain rate on the B and C sections. The inner face of cup 30 is perforated as at 42 and this provides in conjunction with the remainder of the structure individual $NH_3$ manifolding provisions. The A section of the battery 44 which is centrally located consists of a polypropylene container 46 which in FIG. 2 is shown as being of hexagonal shape with closed bottom 48 and top 50. A central opening 52 is provided in top 50 and a tube 54 of smaller diameter than opening 52 extends downwardly and is connected to bottom 48. It will be noted that top 50 tapers from near the center to the outer periphery thereof for purposes which will appear hereinafter.

A metal terminal plate 56 has mounted thereon the guide tube 24 having notches 58 in the upper end thereof and forming part of the $NH_3$ manifolding system. Terminals 60 are secured on the underside of the terminal plate and leads 62 extend through the plate for ultimate connection to leads 63 or the like to the various electrically wired sections.

Filler sections 64 are utilized in the embodiment shown in FIG. 2 with the hexagonal shaped centrally located A section. These have flat inner faces 66 adapted for juxtaposition against the outer surfaces of the hexagonal A section in assembled relationship and outwardly extending sides 68 together with circular segment end surfaces 70 adapted for coacting with the curved inner face of the B and C sections when assembled. A plurality of $NH_3$ manifolding ports 72 are provided in the upper portion of the filler sections. When the battery section has been assembled as shown in FIG. 1, the various A, B, and C sections in conjunction with one another, the container and the filler pieces form a compact unit in which the various portions are securely held against displacement by vibration or the like or at any disposition. When the battery section has been so assembled then a polypropylene or the like top disc is placed over the assembled A, B and C sections and heat sealed over and to the material of the section cups so that a completely insulated and sealed battery section results with the exception of a central port 76.

When activation of the battery is desired, the lance 20 is displaced downwardly thereby rupturing the area 18 of bulkhead 16 permitting liquid ammonia to flow down into the guide tube and it is discharged through the notches at 58 so that it flows outwardly over the tapered top 50 and thence through openings 72 and perforations 42 to contact the cells 28 in the B–C sections of the battery. At the same time the liquid ammonia will flow through the space between the central opening 52 and tube 40 so as to actively engage with the A cells 76 in the A section and the battery is thus activated.

If desired, grooves or the like could be provided in the upper surface of top 50 to facilitate or guide manifolding of the liquid ammonia.

A modification of the invention is shown in FIG. 3 wherein the center hexagonal cup section for the A section is replaced with an essentially round construction, generally designated 78, again provided with a central opening 80 and $NH_3$ porting grooves 82 in the side walls thereof. Additional passages 84 for electrical connection can be provided. In operation the flow of liquid ammonia is substantially the same as in the described embodiment of FIG. 2 as is the operation.

Manifestly minor changes in details of construction can be effected in the invention without departing from the spirit and scope thereof as defined in and limited solely by the appended claims.

We claim:
1. A rapid activating liquid ammonia battery including a battery section and a liquid ammonia reservoir, rupturable bulkhead separating said section and said reservoir, said battery section including a central A section and a plurality of B–C sections disposed peripherally about said A section, the cells of each section being enclosed in individual plastic cups and the entire battery section being enclosed in plastic, means for rupturing said bulkhead to discharge said liquid ammonia into said battery section, means for distributing the liquid ammonia into operating contact with the cells in each of said A–B–C sections to thereby activate the battery and means for electrically connecting all of said sections of the battery.

2. A battery as claimed in claim 1, said A section being hexagonal, said B–C sections being arcuate, filler sections being interposed between said A and B–C sections and forming a circular array in fixed relationship and liquid ammonia manifolding means for each said B–C cup and said A cup to insure distribution of said liquid ammonia.

3. A battery as claimed in claim 2, said manifolding means for said B–C cups including ports through the upper portion of each said filler section and perforation through the inner face of each said cup.

4. A battery as claimed in claim 3, the upper surface of said A cup sloping downwardly toward its periphery to enhance flow of liquid ammonia to said B–C sections.

5. A battery as claimed in claim 4, a central opening in the upper surface of said A cup to permit introduction thereinto of liquid ammonia.

6. A battery as claimed in claim 1, said A section being essentially cylindrical, a plurality of manifolding grooves in the outer surface thereof and manifolding ports therethrough for distributing liquid ammonia to the cells of said B–C sections.

7. A battery as claimed in claim 6, said cylindrical A section having a central opening in the upper surface thereof to permit introduction therein of liquid ammonia.

8. A battery portion for a rapid activating liquid ammonia battery comprising a central A section and a plurality of B–C sections arranged in a circular array surrounding said A section, each section comprising a plurality of cells superimposed one on top of the other enclosed in a plastic jacket, each of said B–C sections being of a segmented circular shape including an arcuate inner wall confronting a portion of the central section, an arcuate outer wall and flat planar side walls, the confronting side walls of adjacent B–C sections abutting one another and means for electrically connecting all of said sections of the battery.

9. A battery as claimed in claim 8 wherein said central A section is of polygonal cross section and wherein the arcuate inner wall of each of said B–C sections confronts one of the side walls of the central section.

10. A battery as claimed in claim 8 wherein the central A section is generally cylindrical in shape.

11. A rapid activating liquid ammonia battery including a battery portion and a liquid ammonia reservoir, a rupturable bulkhead separating said battery portion and said reservoir, said battery portion including a central A section and a plurality of B–C sections arranged in a circular array surrounding said A section, each section comprising a plurality of cells superimposed one on top of the other enclosed in a plastic jacket, each of said B–C sections being of a segmented circular shape including an arcuate inner wall confronting a portion of the central section and an arcuate outer wall and flat planar side walls, the confronting side walls of adjacent B–C sections abutting one another, means for electrically connecting all of said sections of the battery, said bulkhead including an area adapted to be ruptured to provide an inlet opening to discharge liquid ammonia into said battery portion and ammonia manifolding system means for distributing the liquid ammonia into operating contact with the cells in each of the A–B–C sections to thereby activate the battery.

12. A battery as claimed in claim 11 including a plastic housing enclosing the entire battery portion.

13. A battery as claimed in claim 12 wherein said plastic housing has an opening therein disposed adjacent the inlet opening in said bulkhead and wherein the top of said central A section slopes downwardly to define a weir adjacet the inlet opening thereby insuring optimum distribution of the liquid ammonia to the B–C sections.

14. A battery as claimed in claim 11 wherein said A section is polygonal in cross section and including filler sections interposed between said A and B–C sections and forming a circular array in predetermined relationship.

15. A battery as claimed in claim 11 wherein said central A section is polygonal in cross section and wherein the arcuate inner wall of each of said B–C sections confronts one of the sidewalls of the central section.

16. A battery as claimed in claim 11 wherein the central A section is generally cylindrical in shape and includes a plurality of circumferentially spaced axially extending porting grooves in the outer wall thereof forming a part of the manifolding system.

17. A rapid activating liquid ammonia battery including a battery portion and a liquid ammonia reservoir, a rupturable bulkhead separating said battery portion and said reservoir, said battery portion including a central A section and a plurality of B–C sections arranged in a circular array surrounding said A section, each section comprising a plurality of cells superimposed one on top of the other enclosed in a rigid plastic jacket snugly embracing the cells, each of said B–C sections being of a segmented circular shape including an arcuate inner wall confronting a portion of the central section and an arcuate outer wall and flat planar side walls, the confronting side walls of adjacent B–C sections abutting one another, means for electrically connecting all of said sections of the battery, said bulkhead including an area adapted to be ruptured to discharge liquid ammonia into said battery portion and ammonia manifolding system means for distributing the liquid ammonia into operating contact with the cells in each of the A–B–C sections to thereby activate the battery.

References Cited

UNITED STATES PATENTS

| | | | |
|---|---|---|---|
| 2,985,702 | 5/1961 | Darland | 136—90 |
| 2,996,564 | 8/1961 | Morton | 136—90 |
| 3,239,385 | 3/1966 | Meyers | 139—90 |

BENJAMIN R. PADGETT, Primary Examiner

H. P. BEHREND, Assistant Examiner

U.S. Cl. X.R.

136—114